(12) United States Patent
Sabottke et al.

(10) Patent No.: US 7,749,387 B2
(45) Date of Patent: Jul. 6, 2010

(54) INTEGRALLY-LAYERED POLYMERIC MEMBRANES AND METHOD OF USE

(75) Inventors: Craig Y. Sabottke, Annandale, NJ (US); Bal K. Kaul, Fairfax, VA (US); Dennis G. Peiffer, Annandale, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 431 days.

(21) Appl. No.: 11/890,224

(22) Filed: Aug. 3, 2007

(65) Prior Publication Data

US 2008/0035571 A1    Feb. 14, 2008

Related U.S. Application Data

(60) Provisional application No. 60/836,424, filed on Aug. 8, 2006.

(51) Int. Cl.
*B01D 61/00* (2006.01)
*B01D 71/64* (2006.01)
*B01D 71/00* (2006.01)

(52) U.S. Cl. .................. 210/653; 210/651; 210/652; 210/500.39

(58) Field of Classification Search ............ None
See application file for complete search history.

(56) References Cited

U.S. PATENT DOCUMENTS

| | | | |
|---|---|---|---|
| 4,650,574 A | 3/1987 | Hilgendorff et al. | |
| 4,914,064 A | 4/1990 | Schucker | |
| 4,929,358 A | 5/1990 | Koenitzer | |
| 4,944,880 A | 7/1990 | Ho et al. | |
| 4,946,594 A | 8/1990 | Thaler et al. | |
| 4,962,270 A | 10/1990 | Feimer et al. | |
| 4,990,275 A | 2/1991 | Ho et al. | |
| 5,039,418 A * | 8/1991 | Schucker | 210/640 |
| 5,130,017 A | 7/1992 | Schucker | |
| 5,138,023 A | 8/1992 | Sartori et al. | |
| 5,275,726 A | 1/1994 | Feimer et al. | |
| 5,445,731 A | 8/1995 | Tuohey et al. | |
| 5,550,199 A | 8/1996 | Ho et al. | |
| 5,670,052 A | 9/1997 | Ho et al. | |
| 5,685,990 A | 11/1997 | Saugmann et al. | |
| 5,756,643 A * | 5/1998 | Ho et al. | 528/272 |
| 5,855,647 A | 1/1999 | Li et al. | |
| 6,096,114 A | 8/2000 | Li et al. | |
| 6,203,713 B1 | 3/2001 | Tanny | |
| 6,645,383 B1 | 11/2003 | Lee et al. | |
| 2004/0000513 A1 | 1/2004 | Colling et al. | |
| 2004/0004040 A1 | 1/2004 | Colling et al. | |
| 2005/0003204 A1 | 1/2005 | Frankel et al. | |
| 2006/0081500 A1 | 4/2006 | Bitterlich et al. | |

FOREIGN PATENT DOCUMENTS

WO   WO 2006/040307 A1   4/2006
WO   WO 2006/066269 A2   6/2006

\* cited by examiner

*Primary Examiner*—Krishnan S Menon

(57) ABSTRACT

This invention relates to the composition of an integrally-layered polymeric membrane and a process for utilizing the integrally-layered polymeric membrane components of a feedstream. More particularly, but not by way of limitation, this invention relates to the composition of an integrally-layered polymeric membrane and a process for utilizing the integrally-layered polymeric membrane in the separation of aromatics from a hydrocarbon based feedstream. The polymeric membranes of the present invention are fabricated by chemically crosslinking adjacent polymer membrane layers of the same or differing copolymer solutions to produce an integrally-layered polymeric membrane with improved separations properties.

13 Claims, 6 Drawing Sheets

INTEGRALLY-LAYERED POLYMERIC MEMBRANES AND METHOD OF USE

CROSS-REFERENCE TO RELATED APPLICATIONS

This application is a United States utility application which claims priority to U.S. Provisional Patent Application Ser. No. 60/836,424, filed Aug. 8, 2006.

FIELD OF THE INVENTION

This invention relates to the composition of an integrally-layered polymeric membrane and a process for utilizing the integrally-layered polymeric membrane components of a feedstream. More particularly, but not by way of limitation, this invention relates to the composition of an integrally-layered polymeric membrane and a process for utilizing the integrally-layered polymeric membrane in the separation of aromatics from a hydrocarbon based feedstream.

BACKGROUND OF THE INVENTION

Polymeric membrane based separation processes such as reverse osmosis, pervaporation and perstraction are conventional. In the pervaporation process, a desired feed component, e.g., an aromatic component, of a mixed liquid feed is preferentially absorbed by the membrane. The membrane is exposed at one side to a stream comprised of a mixture of liquid feeds and a vacuum is applied to the membrane at the opposite side so that the adsorbed component migrates through the membrane and is removed as a vapor from the opposite side of the membrane via a solution-diffusion mechanism. A concentration gradient driving force is therefore established to selectively pass the desired components through the membrane from its upstream side to its downstream side.

The perstraction process is utilized to separate a liquid stream into separate products. In this process, the driving mechanism for the separation of the stream into separate products is provided by a concentration gradient exerted across the membrane. Certain components of the fluid will preferentially migrate across the membrane because of the physical and compositional properties of both the membrane and the process fluid, and will be collected on the other side of the membrane as a permeate. Other components of the process fluid will not preferentially migrate across the membrane and will be swept away from the membrane area as a retentate stream. Due to the pressure mechanism of the perstraction separation, it is not necessary that the permeate be extracted in the vapor phase. Therefore, no vacuum is required on the downstream (permeate) side of the membrane and permeate emerges from the downstream side of the membrane in the liquid phase. Typically, permeate is carried away from the membrane via a swept liquid.

The economic basis for performing such separations is that the two products achieved through this separation process (i.e., retentate and permeate) have a refined value greater than the value of the unseparated feedstream. Membrane technology based separations can provide a cost effective processing alternative for performing the product separation of such feedstreams. Conventional separation processes such as distillation and solvent extraction can be costly to install and operate in comparison with membrane process alternatives. These conventional based processes can require a significant amount of engineering, hardware and construction costs to install and also may require high levels of operational and maintenance personnel costs to maintain the associated facilities in an operating status. Additionally, most of these processes require the heating of the process streams to relatively high temperatures in order to separate different components during the processing steps resulting in higher energy costs than are generally required by low-energy membrane separation processes.

In general, the membrane technology in the present art has the benefit of lower per unit energy costs per volume of separation than the conventional technologies in present art. However, a major obstacle in perfecting the commercial operation of membrane separation technologies is to improve the flux and selectivity characteristics of the membrane systems in order to make the construction costs and separation efficiencies of membrane technologies economically viable, for example, on a refinery scale operations and on-board vehicle separation processes.

A myriad of polymeric membrane compositions have been developed over the years. Such compositions include polyurea/urethane membranes (U.S. Pat. No. 4,914,064); polyurethane imide membranes (U.S. Pat. No. 4,929,358); polyester imide copolymer membranes (U.S. Pat. No. 4,946,594); polyimide aliphatic polyester copolymer membranes (U.S. Pat. No. 4,990,275); and diepoxyoctane crosslinked/esterfied polyimide/polyadipate copolymer (diepoxyoctane PEI) membranes (U.S. Pat. No. 5,550,199).

Major factors affecting the performance (i.e., the selectivity and flux rate) of a polymeric membrane are the composition of the membrane material, the concentration of the membrane material in solution, the curing or chemical reaction methods, and the final thickness of the cast membrane. In general, for a polymeric given membrane composition, the flux across a given membrane is approximately inversely proportional to the thickness of the membrane. Therefore, the active portion of membranes in the prior art are generally cast as very thin films (on the order of 0.1 to 50 micron thickness) in order derive the selectivity benefit of the membrane while maximizing the flux characteristics of the membrane. However, problems associated with the fabrication and operation of thin membranes include voids and inconsistencies in the membrane structure which affect the membrane performance as well as mechanical instability of the membrane due to their thin structural profile.

Copolymeric membranes of the prior art may be comprised of "soft segments" and "hard segments" and may undergo a "thermal cross-linking" at relatively high temperatures (above approximately 300° C./572° F.) to provide a interchain structural framework to impart mechanical and thermal strength to the membrane. While the soft segments of the polymer provide the active area for the selective diffusion of the permeate through the membrane, they generally possess limited structural and thermal strength characteristics. Therefore, in order to provide the membrane sufficient structural integrity, the polymer soft segments are polymerized with the hard polymer segments to form copolymer chains. In this way, the hard segments of the copolymer chain provide the necessary mechanical and thermal strength to the overall membrane. However, these hard segments of the copolymer chains possess limited, if any, permeability of the process stream components. The problem that exists is that the copolymer membranes that result from thermal cross-linking, while relatively mechanically stable, have limited flux and/or selectivity characteristics.

A specific problem that exists in the industry is that many of the membranes in the art have a hard or "glassy" composition texture. These membrane compositions do not allow for subsequent layers to be applied and be integrally bonded with the preceding membrane layer. These single-layered membranes have limited dimensionalities of separation properties without the improved and/or tailored separation performance characteristics that may be attained through the synergistic effect of integrating multiple differing copolymer concentrations or compositions into a single membrane.

Therefore, there exists in the industry a need for a selective membrane which compositional characteristics can be tailored by integrating multiple membrane layers of varying polymer concentrations or compositions resulting in a multi-layered membrane with improved separations performance characteristics.

SUMMARY OF THE INVENTION

The present invention relates to the composition of an integrally-layered polymeric membrane, a method for making and a process for its use.

In an embodiment, the present invention is a polymeric membrane comprising, at least two adjacent polymer membrane layers, wherein the two adjacent polymer membrane layer compositions are chemically cross-linked between the contacting faces of the two adjacent polymer membrane layers thereby forming a integrally-layered, multi-layer membrane, and wherein each of the two adjacent polymer membrane layer compositions is comprised of a dianhydride, a diamine, a cross-linking agent and a difunctional dihydroxy polymer selected from:

a) dihydroxy end-functionalized ethylene propylene copolymers with an ethylene content from about 25 wt % to about 80 wt %;
b) dihydroxy end-functionalized ethylene propylene diene terpolymers with an ethylene content from about 25 wt % to about 80 wt %;
c) dihydroxy end-functionalized polyisoprenes; dihydroxy end-functionalized polybutadienes; dihydroxy end-functionalized polyisobutylenes;
d) dihydroxy end-functionalized acrylate homopolymers, copolymers and terpolymers; dihydroxy end-functionalized methacrylate homopolymers, copolymers and terpolymers; and mixtures thereof, wherein the mixtures of acrylate and methacrylate monomers range from $C_1$ to $C_{18}$;
e) dihydroxy end-functionalized condensation homopolymers, copolymers, terpolymers and higher order compositions of structurally different monomers, including alcohol-terminated end-functionalized esters and dihydroxy end-functionalized multimonomer polyesters; and mixtures thereof; wherein the polyalkyladipate structures range from $C_1$ to $C_{18}$;
f) dihydroxy end-functionalized perfluoroelastomers;
g) dihydroxy end-functionalized urethane homopolymers, copolymers, terpolymers, and higher order compositions of structurally different monomers;
h) dihydroxy end-functionalized carbonate homopolymers, copolymers, terpolymers, and higher order compositions of structurally different monomers;
i) dihydroxy end-functionalized ethylene alpha-olefin copolymers; dihydroxy end-functionalized propylene alpha-olefin copolymers; and dihydroxy end-functionalized ethylene propylene alpha-olefin terpolymers; wherein the alpha-olefins are linear or branched and range from $C_3$ to $C_{18}$;
j) dihydroxy end-functionalized styrene homopolymers, copolymers, terpolymers, and higher order compositions of structurally different monomers;
k) dihydroxy end-functionalized silicone homopolymers, copolymers, terpolymers, and higher order compositions of structurally different monomers;
l) dihydroxy end-functionalized styrene butadiene copolymers; dihydroxy end-functionalized styrene isoprene copolymers; and
m) dihydroxy end-functionalized styrene butadiene block copolymers; and dihydroxy end-functionalized styrene isoprene block copolymers.

In a preferred embodiment, the polymer membrane layers are comprised of hard and soft polymer segments and the glass transition temperature, $T_g$, of the soft segment of at least one polymer membrane layer is less than 77° F. (25° C.). In another preferred embodiment, the polymer membrane layers are comprised of hard and soft polymer segments and the Absorbance Infra-red Spectrum of at least one polymer membrane layer has an of Aliphatic C-H Area to Aromatic C-H Area ratio of at least 10.

In a preferred embodiment, the method for making the integrally-layered polymeric membrane of the present invention comprises:

a) forming a first polymer membrane layer comprised of a dianhydride, a diamine, a cross-linking agent and a difunctional dihydroxy polymer selected from:
i) dihydroxy end-functionalized ethylene propylene copolymers with an ethylene content from about 25 wt % to about 80 wt %;
ii) dihydroxy end-functionalized ethylene propylene diene terpolymers with an ethylene content from about 25 wt % to about 80 wt %;
iii) dihydroxy end-functionalized polyisoprenes; dihydroxy end-functionalized polybutadienes; dihydroxy end-functionalized polyisobutylenes;
iv) dihydroxy end-functionalized acrylate homopolymers, copolymers and terpolymers; dihydroxy end-functionalized methacrylate homopolymers, copolymers and terpolymers; and mixtures thereof, wherein the mixtures of acrylate and methacrylate monomers range from $C_1$ to $C_{18}$;
v) dihydroxy end-functionalized condensation homopolymers, copolymers, terpolymers and higher order compositions of structurally different monomers, including alcohol-terminated end-functionalized esters and dihydroxy end-functionalized multimonomer polyesters; and mixtures thereof; wherein the polyalkyladipate structures range from $C_1$ to $C_{18}$;
vi) dihydroxy end-functionalized perfluoroelastomers;
vii) dihydroxy end-functionalized urethane homopolymers, copolymers, terpolymers, and higher order compositions of structurally different monomers;
viii) dihydroxy end-functionalized carbonate homopolymers, copolymers, terpolymers, and higher order compositions of structurally different monomers;
ix) dihydroxy end-functionalized ethylene alpha-olefin copolymers; dihydroxy end-functionalized propylene alpha-olefin copolymers; and dihydroxy end-functionalized ethylene propylene alpha-olefin terpolymers; wherein the alpha-olefins are linear or branched and range from $C_3$ to $C_{18}$;
x) dihydroxy end-functionalized styrene homopolymers, copolymers, terpolymers, and higher order compositions of structurally different monomers;

xi) dihydroxy end-functionalized silicone homopolymers, copolymers, terpolymers, and higher order compositions of structurally different monomers;

xii) dihydroxy end-functionalized styrene butadiene copolymers; dihydroxy end-functionalized styrene isoprene copolymers; and xiii) dihydroxy end-functionalized styrene butadiene block copolymers; and dihydroxy end-functionalized styrene isoprene block copolymers;

b) drying the first polymer membrane layer;

c) incorporating a second polymer layer onto the first polymer layer, wherein the second polymer layer is comprised of a dianhydride, a diamine, a cross-linking agent and a difunctional dihydroxy polymer selected from a-i) through a-xiii) above, to form an uncured layered membrane; and d) curing the uncured layered membrane at a temperature of from about 212° F. to about 482° F. (100° C. to 250° C.) to form a integrally-layered polymeric membrane.

In yet another preferred embodiment, the integrally-layered polymeric membrane of the present invention is utilized in a process for separating an aromatic rich permeate stream from a hydrocarbon feedstream. In another embodiment, the integrally-layered polymeric membrane is utilized in a process to separate a permeate stream rich in sulfur heteroatoms from a hydrocarbon feedstream. In still another embodiment, a permeate stream rich in nitrogen heteroatoms is separated from a hydrocarbon feedstream utilizing an integrally-layered polymeric membrane.

DETAILED DESCRIPTION OF THE PREFERRED EMBODIMENTS

Figure 1:
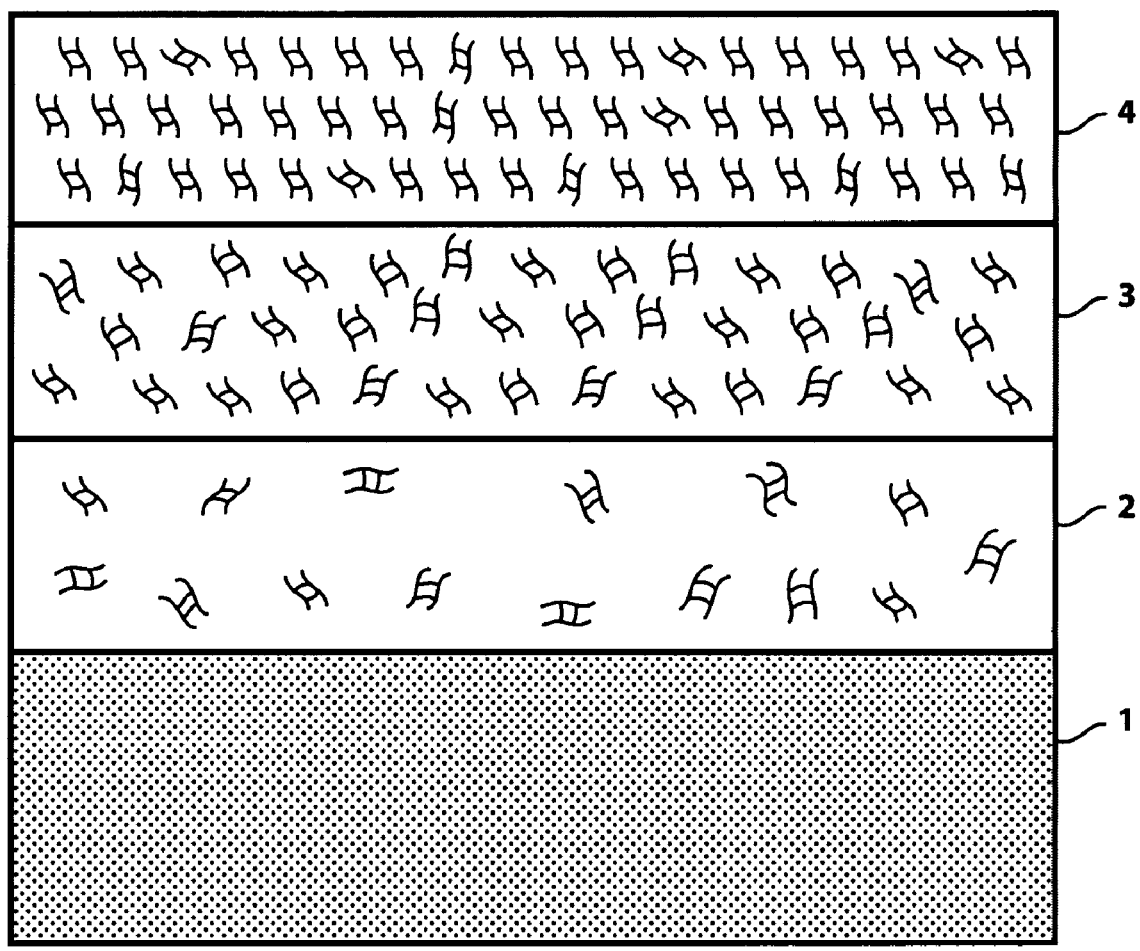
FIG. 1 illustrates one embodiment of an integrally-layered polymeric membrane of the present invention wherein the final membrane is comprised of three integral membrane layers formed from three separate copolymer solutions of differing polymer concentrations incorporated upon a suitable support.

The present invention solves the problem in the prior art by relying on specific polymers in conjunction chemical cross-linking agents wherein polymer solutions are incorporated in layers to form a single, integrated membrane element. The compositions and curing processes of the present invention result in membrane layers that have a "tacky" consistency after the intermediate drying step as compared to the hard or glassy consistency of the membranes of the prior art. This allows subsequent layers of the polymer solutions to be incorporated onto the preceding membrane layers and be integrally bonded via chemical crosslinking between adjacent membrane layers resulting in a single, integrated, multi-layered membrane with improved separations characteristics.

In addition to the synergistic effects of multi-layering the membrane, it is also believed that in a preferred embodiment, that utilizing a low-energy chemical cross-linking process also results in an improved polymer chain structure and membrane morphology wherein the polymer chain-to-chain orientation and active polymer segment retention is improved. In an embodiment of the present invention the membrane is comprised of hard and soft polymer segments and has thermal glass transition temperature ($T_g$) of the soft segments that are very low. In preferred embodiments, the membranes of the present invention will also have improved soft-to-hard segment ratios resulting in membranes with improved separation properties. Additionally, as a result of the integral-layering of the polymer solutions in the final membrane, tailoring of specific membrane properties may be achieved by utilizing integral membrane layers of differing polymer concentrations in solution, differing polymer compositions, differing layer thicknesses, or combinations thereof.

In the present invention, the chemically cross-linked membrane layers can be integrally-layered to form a single membrane element. In the prior art, with membranes which undergo relatively high temperature thermal curing above about 250 to 300° C. (482 to 572° F.) and their resultant glassy membrane consistencies, it is difficult, if not impossible, to incorporate integrated layers of the differing membrane copolymer solutions into a single membrane element. On the one hand, in the prior art, a subsequent membrane layer can not be applied onto a preceding membrane layer prior to thermal curing of a preceding layer since each preceding layer does not have the structural strength characteristics necessary to allow the application of the subsequent layer prior to thermal curing. On the other hand, if the preceding layer is thermally cured prior to the installation of the subsequent layer, the two adjoining layers do not integrally bond resulting in laminations and voids between the layers which can affect the final performance and stability of the resulting membrane. Alternatively, even assuming that layering of the membrane polymer solutions could be physically accomplished during the manufacturing processes of the prior art without first curing a preceding layer, most, if not all, of the benefits of varying the layers' concentrations or compositions would be destroyed during the thermal curing process as the differing concentrations or compositions would diffuse through adjacent membrane layers and result in a final near homogenous or diffused membrane structure.

As used herein, the term "hydrocarbon" means an organic compound having a predominantly hydrocarbon character. Accordingly, organic compounds containing one or more non-hydrocarbon radicals (e.g., sulfur or oxygen) would be within the scope of this definition. As used herein, the terms "aromatic hydrocarbon" or "aromatic" means a hydrocarbon-based organic compound containing at least one aromatic ring. The rings may be fused, bridged, or a combination of fused and bridged. In a preferred embodiment, the aromatic species separated from the hydrocarbon feed contains one or two aromatic rings. The terms "non-aromatic hydrocarbon" or "non-aromatic" or "saturate" means a hydrocarbon-based organic compound having no aromatic cores. Also as used herein, the terms "thermally cross-linked" or "thermal cross-linking" means a membrane curing process at curing temperatures typically above about 250 to 300° C. (482 to 572° F.) characterized by hydrogen bonding of neighboring polymeric chains in solution. The term "chemically cross-linked" or "chemical cross-linking" means a chemical curing process characterized by the principal reaction of chemical bonding of neighboring polymeric chains in solution via imidization thereby forming a three-dimensional polymer network. Also as used herein, the term "selectivity" or "aromatic selectivity" means the ratio of the desired component(s) in the permeate to the non-desired component(s) in the permeate divided by the ratio of the desired component(s) in the feedstream to the non-desired component(s) in the feedstream. Also, the term "flux" or "normalized flux" is defined the mass rate of flow of the permeate across a membrane, normally expressed in units of $Kg/m^2$-day, $Kg/m^2$-hr, $Kg$-$\mu m/m^2$-day, or $Kg$-$\mu m/m^2$-hr. As used herein, the term "integral" or "integrally layered" means that the layers of the membrane are physically bonded to each other to such as extent that when viewed under a scanning electron microscope, the layer interfaces of the same or similar membrane copolymer compositions will be appear to be significantly absent of any voids or laminations between the mating membrane layers.

In one embodiment, the present invention includes the use of specific polymers that will provide the intermediate and final composition and physical properties necessary to achieve the integral, multi-layering of the membranes of the present invention.

The present invention utilizes membrane layers of polymeric membrane compositions to form the integrally-layered polymeric membrane, wherein the integrated membrane layers are each comprised of a dianhydride, a diamine, a cross-linking agent and a difunctional dihydroxy polymer selected from:

a) dihydroxy end-functionalized ethylene propylene copolymers with an ethylene content from about 25 wt % to about 80 wt %;

b) dihydroxy end-functionalized ethylene propylene diene terpolymers with an ethylene content from about 25 wt % to about 80 wt %;

c) dihydroxy end-functionalized polyisoprenes; dihydroxy end-functionalized polybutadienes; dihydroxy end-functionalized polyisobutylenes;

d) dihydroxy end-functionalized acrylate homopolymers, copolymers and terpolymers; dihydroxy end-functionalized methacrylate homopolymers, copolymers and terpolymers; and mixtures thereof, wherein the mixtures of acrylate and methacrylate monomers range from $C_1$ to $C_{18}$;

e) dihydroxy end-functionalized condensation homopolymers, copolymers, terpolymers and higher order compositions of structurally different monomers, including alcohol-terminated end-functionalized esters and dihydroxy end-functionalized multimonomer polyesters; and mixtures thereof;

wherein the polyalkyladipate structures range from $C_1$ to $C_{18}$;

f) dihydroxy end-functionalized perfluoroelastomers;

g) dihydroxy end-functionalized urethane homopolymers, copolymers, terpolymers, and higher order compositions of structurally different monomers;

h) dihydroxy end-functionalized carbonate homopolymers, copolymers, terpolymers, and higher order compositions of structurally different monomers;

i) dihydroxy end-functionalized ethylene alpha-olefin copolymers; dihydroxy end-functionalized propylene alpha-olefin copolymers; and dihydroxy end-functionalized ethylene propylene alpha-olefin terpolymers;

wherein the alpha-olefins are linear or branched and range from $C_3$ to $C_{18}$;

j) dihydroxy end-functionalized styrene homopolymers, copolymers, terpolymers, and higher order compositions of structurally different monomers;

k) dihydroxy end-functionalized silicone homopolymers, copolymers, terpolymers, and higher order compositions of structurally different monomers;

l) dihydroxy end-functionalized styrene butadiene copolymers; dihydroxy end-functionalized styrene isoprene copolymers; and m) dihydroxy end-functionalized styrene butadiene block copolymers; and dihydroxy end-functionalized styrene isoprene block copolymers.

In a more preferred embodiment, the present invention utilizes membrane layers of polymeric membrane compositions to form the integrally layered polymeric membrane, wherein the integrated membrane layers are each comprised of a dianhydride, a diamine, a cross-linking agent and a difunctional dihydroxy polymer selected from:

a) dihydroxy end-functionalized condensation homopolymers, copolymers, terpolymers and higher order compositions of structurally different monomers, including alcohol-terminated end-functionalized esters and dihydroxy end-functionalized multimonomer polyesters; and mixtures thereof;

wherein the polyalkyladipate structures range from $C_1$ to $C_{18}$;

b) dihydroxy end-functionalized perfluoroelastomers;

c) dihydroxy end-functionalized urethane homopolymers, copolymers, terpolymers, and higher order compositions of structurally different monomers;

d) dihydroxy end-functionalized carbonate homopolymers, copolymers, terpolymers, and higher order compositions of structurally different monomers;

e) dihydroxy end-functionalized ethylene alpha-olefin copolymers; dihydroxy end-functionalized propylene alpha-olefin copolymers; and dihydroxy end-functionalized ethylene propylene alpha-olefin terpolymers;

wherein the alpha-olefins are linear or branched and range from $C_3$ to $C_{18}$; and f) dihydroxy end-functionalized silicone homopolymers, copolymers, terpolymers, and higher order compositions of structurally different monomers.

In yet an even more preferred embodiment, the present invention utilizes membrane layers of polymeric membrane compositions to form the integrally layered polymeric membrane, wherein the integrated membrane layers are each comprised of a dianhydride, a diamine, a cross-linking agent and a difunctional dihydroxy polymer selected from:

a) dihydroxy end-functionalized condensation homopolymers, copolymers, terpolymers and higher order compositions of structurally different monomers, including alcohol-terminated end-functionalized esters and dihydroxy end-functionalized multimonomer polyesters; and mixtures thereof;

wherein the polyalkyladipate structures range from $C_1$ to $C_{18}$;

b) dihydroxy end-functionalized perfluoroelastomers;

c) dihydroxy end-functionalized carbonate homopolymers, copolymers, terpolymers, and higher order compositions of structurally different monomers; and d) dihydroxy end-functionalized ethylene alpha-olefin copolymers; dihydroxy end-functionalized propylene alpha-olefin copolymers; and dihydroxy end-functionalized ethylene propylene alpha-olefin terpolymers;

wherein the alpha-olefins are linear or branched and range from $C_3$ to $C_{18}$.

It should be noted that each of the layers of the multi-layered polymeric membrane of the present invention need not be limited to single compositions of the polymers listed above. Solutions of differing polymer compositions may be mixed and/or solutions of differing polymer molecular weights may be mixed in ratios and practices known to one of ordinary skill in the art in order to arrive at the compositions for each of the individual membrane layers of the composite membrane of the present invention.

Preferred embodiments and additional details of the polymer compositions and their fabrication are more fully described in a concurrently filed, U.S. Provisional Patent Application Ser. No. 60/836,423 filed on Aug. 8, 2006 and its corresponding U.S. Utility patent application Ser. No. 11/890,225 entitled "Chemically Cross-Linked Polymeric Membranes and Method of Use" which is herein incorporated by reference. Polymer membrane layers of the present invention may utilize membranes compositions as disclosed in Patent Application Ser. No. 60/836,423 and its corresponding U.S. Utility patent application.

In a preferred embodiment of the present invention, a polymer solution as described above is deposited onto a suitable membrane casting substrate, the cast membrane assembly is thereafter subjected to an intermediate drying step to drive off some of the solvents in the membrane solution to result in an uncured membrane with a somewhat "tacky" consistency. Actual drying temperatures, drying durations and other drying conditions will depend on the such variables inherent in the membrane being fabricated such as the thickness of the incorporated membrane solutions, the composition of the membrane solutions, the pre- and post-preparation and incorporation techniques, the number of integrated layers, the support materials, and the support configuration. For example, in an embodiment, a polymer solution as described above may be cast upon a porous polytetrafluoroethylene (e.g., Teflon®) sheet using conventional casting techniques that are known to one skilled in the art. This cast membrane layer and substrate is then subjected to an intermediate drying step. The intent of this intermediate drying step is to evaporate a portion of the solvent to improve the consistency of the polymer layer for subsequent layer deposition. Although this drying step may be performed at standard atmospheric temperatures and pressure, it is preferred that the cast layer be dried at a temperature of about 122° F. to about 257° F. (50 to 125° C.). Regardless, the intermediate drying temperature should be maintained below the threshold temperature to promote the endothermic crosslinking reactions of the polymer compounds. Generally the duration for the drying step is from about 2 minutes to about 20 minutes. However, it should be noted that the temperatures and durations of the intermediate drying steps can vary significantly based on the variables noted above. This intermediate drying step may be performed in an air environment or alternatively, the drying step may be performed under an inert atmosphere, such as nitrogen.

Following the intermediate drying step, an additional polymer solution layer or layers may be added to the intermediate layers in similar fashion, with each layering step followed by an intermediate drying step to form the un-cured membrane configuration. After the final layer has been incorporated, the membrane is cured at temperatures sufficient to promote the imidization reactions cross-linking the polyimide hard segments of neighboring chains resulting in a three-dimensional polymeric membrane structure. The uncured, layered membrane may be cured at temperatures from about 212° F. to about 752° F. (100° C. to about 400° C.). However, it is preferred that the final membrane configuration be cured at temperatures from about 212° F. to about 482° F. (100° C. to about 250° C.), preferably from about 212° F. to about 392° F. (100° C. to about 200° C.) sufficient to allow the endothermic chemical cross-linking reactions while retaining significant volume of the membrane soft segment.

The duration of time for the final curing step depends upon many factors, but generally, each membrane layer need only be cured for a sufficient period of time to allow the chemical cross-linking reactions both internal to and across the individual membrane layers to be completed. This may depended on many factors such as the thickness of the incorporated membrane solutions, the composition of the membrane solutions, the pre- and post-preparation and incorporation techniques, the number of integrated layers, the support materials, and the support configuration. Although there are not known defined limitations to the curing duration, the curing is generally performed for a duration of at least 0.5 hour. Preferably, the curing duration is about 0.5 to about 48 hours, more preferably, about 0.5 to about 24 hours, and even more preferably about 1 to about 12 hours.

This process results in a chemical bond between the layered polymer solutions while retaining the distinct characteristics of the individual polymer layers. The resulting integrally-layered membrane possesses a continuous, fused membrane structure wherein the individual layers retain their separate structural and diffusivity properties resulting is a final multi-layered integral membrane structure with synergistic properties of the varying layer concentrations, compositions and/or thicknesses.

This process of layering may be performed multiple times and each subsequent layer may be incorporated onto a preceding layer by casting or other polymer layering techniques that are known in the art for single layer manufacturing and are compatible with the characteristics of the multi-layered polymeric membrane. The resulting membrane of the present invention is an integral, multi-layered polymeric membrane with unexpected improved separations properties which also may be tailored through the use of different membrane solution compositions and/or concentrations utilized in the layering staging of the membrane fabrication. While there are no theoretical limitations to the number of layers that may be incorporated, there are practical limitations of membrane incorporation machinery, thermal conduction, fabrication time, and incremental benefits of each layer. In a preferred embodiment, the number of integral membrane layers in the membrane is from 2 to 10 layers, more preferably 2 to 6 layers. The actual configurations including the number of layer as well as each of the layer compositions and concentrations may be selected depending upon the specific separation process characteristics that are desired from the final membrane configuration.

Suitable cross-linking agents include, but are not limited to, diepoxycyclooctane, diepoxyoctane, 1,3-butadiene diepoxide, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, poly(propylene glycol) diglycidyl ether, and mixtures thereof.

The relative concentration of the aromatic C-H components associated with a membrane layer's hard segment and the concentration of the aliphatic C-H components associated with the membrane layer's soft segment can be compared by determining the areas associated with each of these components in their Absorbance Infra-red Spectrum. The method for determining the Aliphatic C-H Area and the Aromatic C-H Area associated with the Absorbance Infra-red Spectrum of a membrane sample is further detailed in Example 4 herein. The areas defined by the Aliphatic C-H Area and the Aromatic C-H Area for a particular membrane sample provide a proportional measurement of the content of a membrane sample's soft and hard segments respectfully. While these areas should not be used to directly compare one membrane sample to another membrane sample, the ratio of the Aliphatic C-H Area to Aromatic C-H Area from one sample can be compared to the ratio of the Aliphatic C-H Area to Aromatic C-H Area of another sample to determine the relative soft to hard ratios in the final membranes. The determination of the value of the Aliphatic C-H Area and Aromatic C-H Area for a membrane sample as used herein is further illustrated and defined in Example 4 and associated FIGS. 3, 4, 5, and 6.

In an embodiment of the present invention, the Absorbance Infra-red Spectrum of at least membrane layer has an Aliphatic C-H Area to Aromatic C-H Area ratio of at least 10. In a preferred embodiment, the Absorbance Infra-red Spectrum of at least membrane layer has an Aliphatic C-H Area to Aromatic C-H Area ratio of at least 15, and even more preferably an Aliphatic C-H Area to Aromatic C-H Area ratio of least 20. In a most preferred embodiment, the Absorbance Infra-red Spectrum of at least membrane layer has an Aliphatic C-H Area to Aromatic C-H Area ratio of at least 25. Since it is believed that the permeation performance of the membrane of the present invention is primarily attributable to the membrane soft segment, this increase in soft segment concentration results in improved separations performance properties for the membrane of the present invention.

In one embodiment, the polymer solution for a membrane layer is cooled and maintained at a temperature of less than about 100° F. (38° C.), preferably 80° F. (27° C.), more preferably less than about 40° F. (4° C.) prior to incorporation of the cross-linking agent. It is preferred if the temperature of the polymer solution is maintained for at least 12 hours, preferably, 24 hours, and more preferably at least 72 hours prior to incorporating the cross-linking agent into the polymer solution. This allows for the polymers in solution to equilibrate prior to forming and curing the final membrane.

The resulting separation characteristics of the integrally-layered membranes of the present invention are unexpected. What has been discovered is that by integral-layering of the chemically cross-linked membrane materials of the present invention that the resultant membranes may not have the expected result of the prior art wherein the flux rate decreases proportionally with the thickness of the layering. On a normalized flux basis (i.e., where the flux rates are adjusted for the thickness of the membrane) it would be expected that the flux-selectivity properties of a multi-layered membrane of present invention would overlap the flux-selectivity properties of the single-layered membrane of similar composition and fabrication procedures. Unexpectedly, what has been discovered is that the integrated multi-layered membranes of the present invention may possess a resultant "shift" of the flux-selectivity properties from the membrane performance properties of both representative membranes of the prior art as well as single-layered membranes of similar composition and fabrication procedures. This discovery is illustrated in more detail in Examples 1 through 3.

FIG. 1 herein illustrates one embodiment of the present invention wherein a membrane assembly of the present invention is comprised of three integrally-cast membrane layers upon a suitable casting support. This illustration represents a further specific embodiment, wherein three layers, each of a different copolymer concentration in solution, are integrally-layered upon a suitable casting support. In the Figure, a copolymer solution comprised of 2% PEI-DECO by weight in a suitable solvent is incorporated upon a suitable substrate (1) to form a first membrane layer (2). The first membrane layer is chemically-crosslinked according to the present invention. Subsequently, a second copolymer solution comprised of 3% PEI-DECO by weight in a suitable solvent is incorporated upon the first membrane layer (2) and is chemically-crosslinked according to the present invention to form a second membrane layer (3). A third copolymer solution comprised of 4% PEI-DECO by weight in a suitable solvent is subsequently incorporated upon the second membrane layer (3) and is chemically-crosslinked according to the present invention to form a third membrane layer (4). The result is a membrane comprised of three integrally-layered copolymer layers wherein each layer in the final membrane has a different "as cured" structure (due to the concentration differences) on a suitable substrate which has distinct flux-selectivity properties from single layer membranes fabricated from only one of the copolymer concentration solutions.

In a preferred embodiment of the present invention, at least one membrane layer of the multi-layered membrane of the present invention in comprised of hard and soft segments, wherein the glass transition temperature ($T_g$) of the soft segment of less than 77° F. (25° C.), preferably less than 32° F. (0° C.), more preferably less than –13° F. (–25° C.), and most preferably less than –58° F. (–50° C.). In another preferred embodiment, at least one membrane layer of the multi-layered membrane also has a glass transition temperature, $T_g$, of hard segment of greater than 212° F. (100° C.), preferably greater than 248° F. (120° C.). In a more preferred embodiment, all of the membrane layers of the multi-layered membrane of the present invention have a glass transition temperature, $T_g$, of the soft segment of less than 77° F. (25° C.), preferably less than 32° F. (0° C.), more preferably less than –13° F. (–25° C.) and most preferably less than –58° F. (–50° C.). In yet another more preferred embodiment, all of the membrane layers of the multi-layered membrane also have a glass transition temperature, $T_g$, of the hard segment of greater than 212° F. (100° C.), preferably greater than 248° F. (120° C.).

Figure 2:
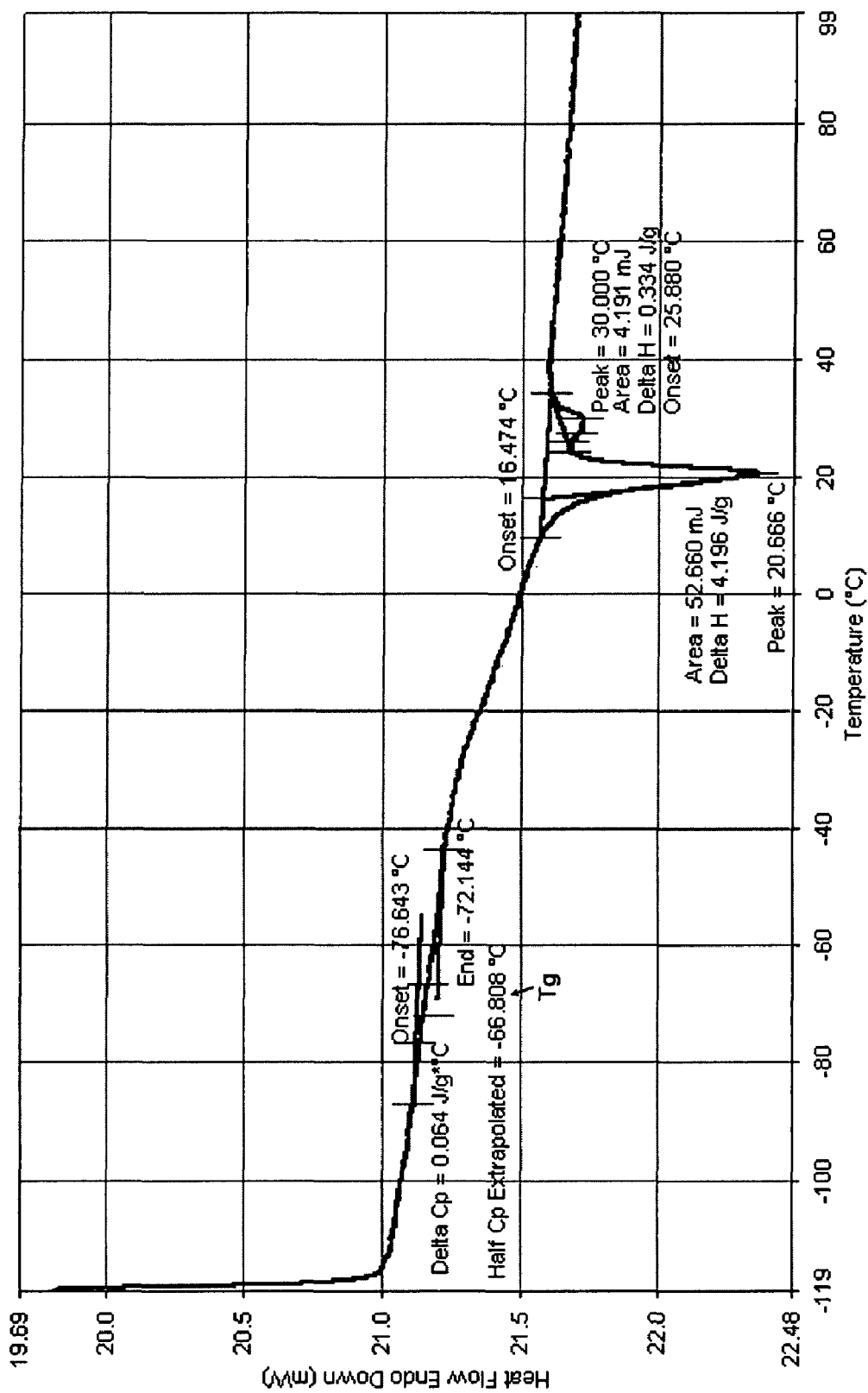
FIG. 2 is a graph of the heat flow vs. temperature testing of one embodiment of a membrane layer composition of the present invention exhibiting a soft segment glass transition temperature, ($T_g$), of about −66.808° C.

FIG. 2 herein is one illustration of the low soft segment glass transition temperature, ($T_g$), that may be obtained in the polyimide polymer membrane layers of the present invention. The synthesis and fabrication of the PEA-DECO chemically cross-linked copolymer membrane possessing the $T_g$ as shown in FIG. 2 are presented in Example 4 herein. As can be seen in FIG. 2, the soft segment glass transition temperature, $T_g$, of the membrane was determined to be about –66.808° C.

In a preferred embodiment, embodiment, the present invention includes the composition and use of at least one polymer membrane layer comprising soft and hard polymer segments wherein the glass transition temperature, ($T_g$), of the soft segment is less than 25° C. The term glass transition temperature, ($T_g$), is well known in the art and is defined in *Thermal Characterization of Polymeric Materials* (E. A. Turi ed., Academic Press, NY, 1981). It should be noted that the glass transition temperature measurements as defined herein are measured on a final composition, cured, and "unswollen" polymer membrane (i.e., no post-cure solvents).

The membrane compositions and configurations of the present invention can be employed in separation processes that employ a membrane in any workable housing configuration such as, but not limited to, flat plate elements, wafer elements, spiral-wound elements, porous monoliths, porous tubes, or hollow fiber elements.

The membrane compositions and configurations of the present invention can also be utilized in both unsupported and supported configurations. A non-limiting example of an unsupported membrane configuration includes casting the membrane on a glass plate and subsequently removing it after the chemical cross-linking reaction is completed. Non-limiting examples of supported membrane configurations include casting the membrane onto a support material fabricated from materials such as, but not limited to, polytetrafluoroethylene (e.g., Teflon®), aromatic polyamide fibers (e.g., Nomex® and Kevlar®), porous metals, sintered metals, porous ceramics, polyester, nylon, activated carbon fibers, latex, silicone, permeable (porous) polymers including polyvinylfluoride, polyvinylidenefluoride, polyurethanes, polypropylenes, polyethylenes, polycarbonates, polysulfones, and polyphenylene oxides, metal and polymer foams (open-cell and closed-cell foams), silica, porous glass, mesh screens, and combinations thereof. Preferably, the polymeric membrane support is selected from polytetrafluoroethylene, aromatic polyamide fibers, porous metals, sintered metals, porous ceramics, polyester, nylon, activated carbon fibers, latex, silicone, permeable (porous) polymers including polyvinylfluoride, polyvinylidenefluoride, polyurethanes, polypropylenes, polyethylenes, polycarbonates, polysulfones, and polyphenylene oxides and combinations thereof.

The membranes described herein are useful for separating a selected component or species from a liquid feed, a vapor/liquid feed, or a condensing vapor feeds. The resultant membranes of this invention can be utilized in both perstractive and pervaporative separation processes.

In a preferred embodiment, the permeate is removed from the permeate zone by a liquid or vapor sweep stream. The permeate dissolves into the sweep stream and is conducted away by sweep stream flow in order to prevent the accumulation of permeate in the permeate zone.

Membrane separation will preferentially operate at a temperature less than the temperature at which the membrane performance would deteriorate or the membrane would be physically damaged or decomposed. For hydrocarbon separations, the membrane temperature would preferably range from about 32° F. to about 950° F. (0 to 510° C.), and more preferably from about 75° F. to about 500° F. (24 to 260° C.).

In a still another preferred embodiment, the operating pressure range in the retentate zone is from about atmospheric pressure to about 150 psig. The operating pressure ranges in the permeate zone is from about atmospheric pressure to about 1.0 mm Hg absolute.

The membranes of this invention are useful for separating a desired species or component from a feedstream, preferably a hydrocarbon feedstream.

In a preferred embodiment, the membrane compositions and configurations above are utilized for the selective separation of aromatics from a hydrocarbon feedstream containing aromatics and non-aromatics.

In another embodiment, the membrane compositions and configurations above are utilized to selectively separate sulfur and nitrogen heteroatoms from a hydrocarbon stream containing sulfur heteroatoms and nitrogen heteroatoms.

In still another embodiment, the hydrocarbon feedstream is a naphtha with a boiling range of about 80 to about 450° F. (27 to 232° C.), and contains aromatic and non-aromatic hydrocarbons. In a preferred embodiment, the aromatic hydrocarbons are separated from the naphtha feedstream. As used herein, the term naphtha includes thermally cracked naphtha, catalytically cracked naphtha, and straight-run naphtha. Naphtha obtained from fluid catalytic cracking processes ("FCC") are particularly preferred due to their high aromatic content.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

EXAMPLES

Example 1

Synthesis and Fabrication of a Single-Layer PEA-DECO Chemically Cross-Linked Copolymer Membrane In the synthesis, 5 g (0.0025 moles) of polyethylene adipate (PEA) diol (2000 g/mole) was reacted with 1.09 g (0.005 moles) of pyromellitic dianhydride (PMDA) to make a prepolymer in the end-capping step (165° C. for 6.5 hours). To this solution was added 25 g of dimethylformamide (DMF). The temperature was allowed to decrease to 70° C. 0.67 g (0.0025 moles) of 4,4-methylene bis(2-chloroaniline) (MOCA) was subsequently added (dissolved in 5 g DMF). In the DMF solution, one mole of the prepolymer reacts with one mole of MOCA to make a copolymer containing polyamic acid hard segment and PEA soft segment in the chain-extension step. An additional 59.5 g of DMF was then added. Subsequently, 89.5 g acetone was added to prevent gelling. The resulting solution was then stirred for 1.5 hours at 70° C. The solution was then cooled to room temperature under continual stirring conditions. 1.4 g (0.005 moles) of diepoxycyclooctane was added to the copolymer-DMF solution.

The final solution was cast onto a porous support of 0.2 micron porous Gortex® Teflon® in a 457.5 cm$^2$ (70.9 in$^2$) casting frame at a mass loading of approximately 0.00158 g/cm$^2$. The membrane casting was first dried at a suitable temperature (e.g., room temperature) to remove most of the solvent (i.e., solvent evaporation), and subsequently low-temperature cured to promote chemical cross-linking at 150° C. (302° F.) for 1.5 hours to promote the reaction of diepoxide with pendent carboxylic acid groups.

Example 2

Synthesis and Fabrication of a Two-Layer PEA-DECO Chemically Cross-Linked Copolymer Membrane In this example, a PEA-DECO polymer solution was prepared in the same manner as Example 1 above. The final solution was cast in a first membrane layer onto a porous support of 0.2 micron porous Gortex® Teflon® in a 9.5" (24.13 cm) diameter casting frame at a mass loading of approximately 0.00129 g/cm$^2$. The first layer of the membrane casting was dried at approximately 100° C. for about 10 minutes to remove most of the solvent (i.e., solvent evaporation). The solution was then cast onto the first membrane layer at a mass loading of approximately 0.00133 g/cm$^2$ to form a second membrane layer. The integrated membrane layers were subsequently low-temperature cured at 150° C. (302° F.) for 1.5 hours to promote chemical cross-linking reactions internal to and at the interface of the first and second membrane layers to form an integrally-layered polyimide membrane.

Example 3

Performance Data of the Single-Layered and Two-Layered PEI-DECO Chemically Cross-Linked Copolymer Membrane A 10 micron disc coupon of 4.7652 cm (1⅞") diameter was cut from the single layer PEI-DECO membrane of Example 1 and similarly from the two-layer integrally-layered PEI-DECO membrane of Example 2. The 10 micron discs were each placed face to face on a very fine flat stainless steel screen and sealed in a membrane holder with a teflon o-ring. The membrane holders were maintained at the desired temperature in a thermostated oven. The effective area each of the membrane assemblies was 9.5 cm$^2$ (1.47 in$^2$).

The membrane coupons were evaluated using a 50% mesitylene/50% decane model feed. The feed was preheated to the desired temperature and flowed over the membrane at 3.6 l/hr (0.951 gal/hr). Permeate was collected under vacuum using traps in series cooled with dry ice and liquid nitrogen respectively.

Table 1 shows the comparative results of using these membranes in separating the aromatic and aliphatic components of the model feed.

TABLE 1

| Membrane | Inlet Pressure (psi) | Vacuum Pressure (torr) | Temperature (° C.) | Flux (g/s-m$^2$) | Aromatic Selectivity |
|---|---|---|---|---|---|
| Single-Layered Membrane from Example 1 | 20 | 1.7 | 141 | 0.21 | 2.56 |
| Two-Layered Membrane from Example 2 | 20 | 2.2 | 143 | 0.21 | 6.29 |

As can be seen from the data in Table 1, at comparable flux rates, the two-layered membrane has an aromatics selectivity of nearly 2.5 times greater than the single-layered membrane.

Example 4

Comparison of the PEA-DECO chemically cross-linked copolymer membrane composition as utilized in the integrally layered membranes of the present invention to the membrane composition of the prior art.

A PEA-DECO chemically cross-linked copolymer membrane of the present invention was synthesized and fabricated as follows:

In the synthesis, 5.0 g (0.0025 moles) of polyethylene adipate (PEA) diol (2000 g/mole) was reacted with 1.09 g (0.005 moles) of pyromellitic dianhydride (PMDA) to make a prepolymer in the end-capping step (165° C. for 7 hours). To this solution was added 25 g of dimethylformamide (DMF). The temperature was allowed to decrease to 70° C. A separately prepared solution of 0.67 g (0.0025 moles) of 4,4-methylene bis(2-chloroaniline) (MOCA) dissolved in 5 g DMF was subsequently added. The solution was stirred at 70° C. for 2.0 hours to prevent gelling. An additional 60 g of DMF and 90.5 g of acetone was added during this time period to prevent gelling. In the DMF/acetone solution, one mole of the prepolymer reacts with one mole of MOCA to make a copolymer containing polyamic acid hard segment and PEA soft segment in the chain-extension step. The solution temperature was allowed to drop to room temperature and 0.70 g (0.005 moles) of Diepoxycyclooctane (DECO) was added to the solution. The solution was stirred at room temperature for 30 minutes. The result was a 4 wt % polymer solution in 50% DMF/50% acetone. An additional 94 g of DMF and 94 g of acetone was added to achieve a 2 wt % polymer solution in 50% DMF/50% acetone.

The 2 wt % polymer solution was centrifuged for 5 minutes. The solution was cast onto a porous support of 0.2 micron porous Gore-Tex® Teflon® and the thickness was adjusted by the use of a knife gap setting of 31 mils. The DMF and acetone was allowed to evaporate at room temperature. The membrane casting was first dried at a suitable temperature (e.g., room temperature) to remove most of the solvent (i.e., solvent evaporation), and subsequently low-temperature cured to promote chemical cross-linking at 180° C. (356° F.) for a minimum cure time of approximately 2.0 hours to promote the reaction of diepoxide with pendent carboxylic acid groups. The final curing step converts the polyamide ester hard segment to the polyimide hard segment via the imide ring closure.

A Diepoxycyclooctane PEI membrane of the prior art was synthesized and fabricated as follows:

In the synthesis, 5.0 g (0.0025 moles) of polyethylene adipate (PEA) diol (2000 g/mole) was reacted with 1.09 g (0.005 moles) of pyromellitic dianhydride (PMDA) to make a prepolymer in the end-capping step (165° C. for 7 hours). To this solution was added 25 g of dimethylformamide (DMF). The temperature was allowed to decrease to 70° C. A separately prepared solution of 0.67 g (0.0025 moles) of 4,4-methylene bis(2-chloroaniline) (MOCA) dissolved in 5 g DMF was subsequently added. The solution was stirred at 70° C. for 2.0 hours to prevent gelling. An additional 60 g of DMF and 90.5 g of acetone was added during this time period to prevent gelling. In the DMF/acetone solution, one mole of the prepolymer reacts with one mole of MOCA to make a copolymer containing polyamic acid hard segment and PEA soft segment in the chain-extension step. The solution temperature was allowed to drop to room temperature and 0.70 g (0.005 moles) of Diepoxycyclooctane (DECO) was added to the solution. The solution was stirred at room temperature for 30 minutes. The result was a 4 wt % polymer solution in 50% DMF/50% acetone. An additional 94 g of DMF and 94 g of acetone was added to achieve a 2 wt % polymer solution in 50% DMF/50% acetone.

The 2 wt % polymer solution was centrifuged for 5 minutes. The solution was cast onto a porous support of 0.2 micron porous Gore-Tex® Teflon® and the thickness was adjusted by the use of a knife gap setting of 31 mils. In the initial drying step, the DMF and acetone were evaporated from the membrane in a box purged with nitrogen gas at room temperature for approximately 6 hours. The membrane was then dried in an oven at 120° C. (248° F.), for about 24 hours. Finally, the membrane was cured at elevated-temperature to promote chemical cross-linking by heating from room temperature to 310° C. (590° F.), maintaining it at this temperature for 144 minutes to promote the reaction of diepoxide with pendent carboxylic acid groups and then cooling it to room temperature. The curing step converts the polyamide ester hard segment to the polyimide hard segment via the imide ring closure.

The Diepoxycyclooctane PEI membrane of the prior art above was made to represent the prior art membranes of U.S. Pat. Nos. 5,550,199 and 5,670,052. Both patents allow diamines to be selected from a group of diamine compounds.

For the preparation of these membrane films, 4,4-methylene bis(2-chloroaniline) (MOCA) is used instead of methylene dianiline (MDA). The use of a halogenated diamine compound containing chlorine provides additional analytical capability in analyzing the membrane films. The chlorine atoms contained in the 4,4-methylene bis(2-chloroaniline) (MOCA) can be identified and detected by SIMS and SEM analytical methods. The synthesis methods used were adjusted to reflect the use of 4,4-methylene bis(2-chloroaniline) instead of the methylene dianiline (MDA) used in the examples disclosed in U.S. Pat. Nos. 5,550,199 and 5,670,052. It is believed that the membrane as formulated is an accurate simulation of the membranes of the prior art.

The use of a halogenated diamine compound containing chlorine (such as MOCA) provides additional analytical capability in analyzing the membrane films. The chlorine atoms are a potential tracer compound that is contained in the membrane film that can be analyzed for using a range of analytical methods known to those skilled in the art. This provides a convenient method for distinguishing between different membrane films created by different methods. This additional analytical characterization of membrane films is significantly more complex if compounds like methylene dianiline (MDA) are used in the preparation of the membrane films.

Each of the two as fabricated membranes above were subjected to Infra-red (IR) Reflectance Spectrum analysis and the results obtained were then converted to an Absorbance Spectrum using the Kubelka Monk transformation. The Absorbance Spectrum format provides a basis for comparison of the membrane characteristics since the band intensities (absorbance) and integrated areas obtained are proportional to the concentrations of the structural components.

Figure 3:
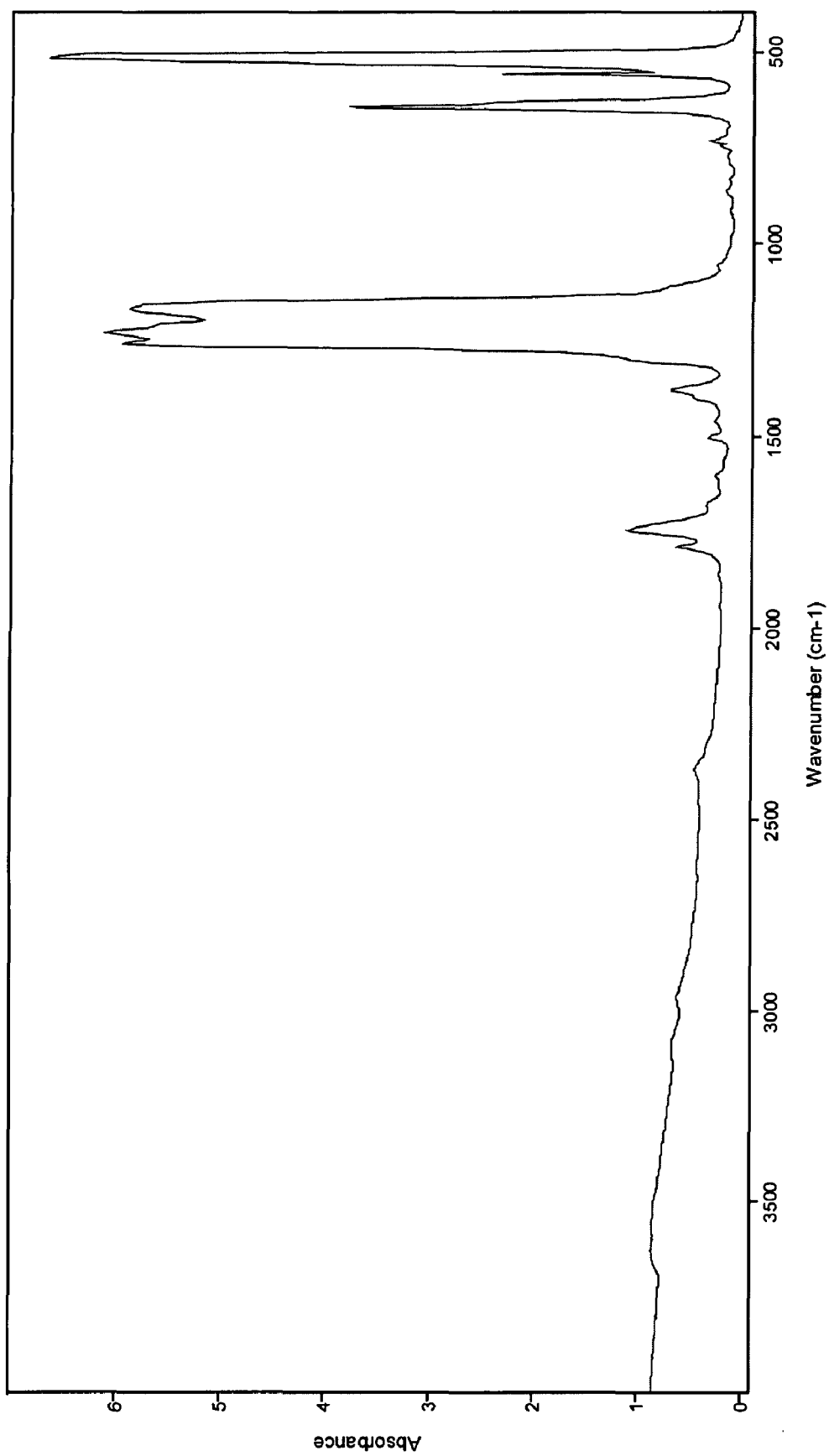
FIG. 3 is the Absorbance Infra-red Spectrum of the prior art membrane composition from Example 4.

The Absorbance Spectrum shown in FIG. 3 corresponds to the Diepoxycyclooctane PEI membrane of the prior art. The Absorbance Spectrum shown in FIG. 4 corresponds to the PEA-DECO chemically cross-linked copolymer membrane which may be used in the membrane layers of the present invention.

Figure 4:
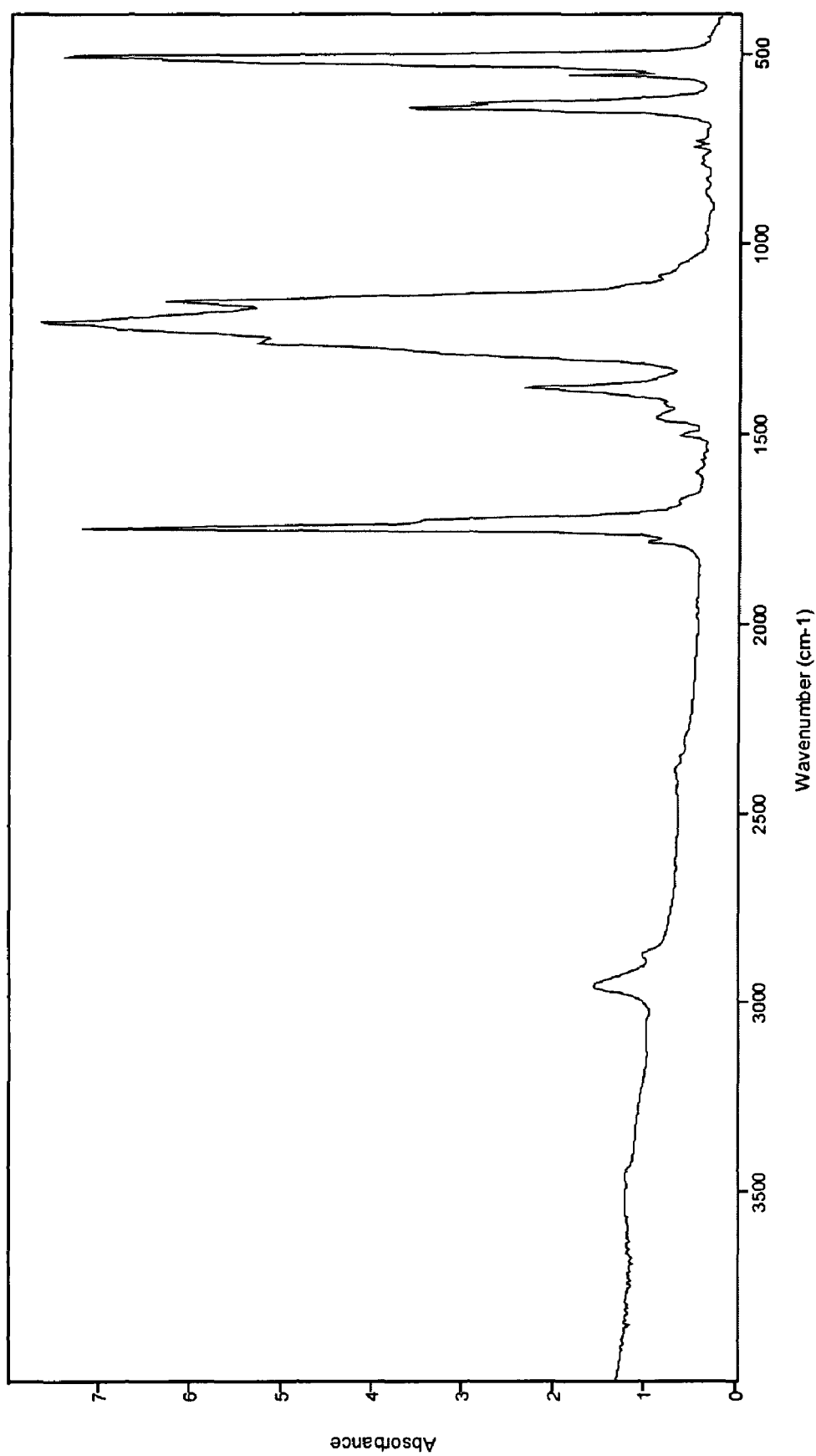
FIG. 4 is the Absorbance Infra-red Spectrum of one embodiment of a membrane layer composition of the present invention from Example 4.

As can be seen comparing FIGS. 3 and 4, significant differences can be seen in the absorbance values corresponding to the wavenumber values of about 3150 to about 2800 cm$^{-1}$, as well as the wavenumber values of 1875 to 1625 cm$^{-1}$. It should be pointed out that in the Absorbance Spectrum data, that values below about 2.0 are highly linear with respect to concentration and can be used for relative compositional comparison of molecular content within a membrane sample.

Figure 5:
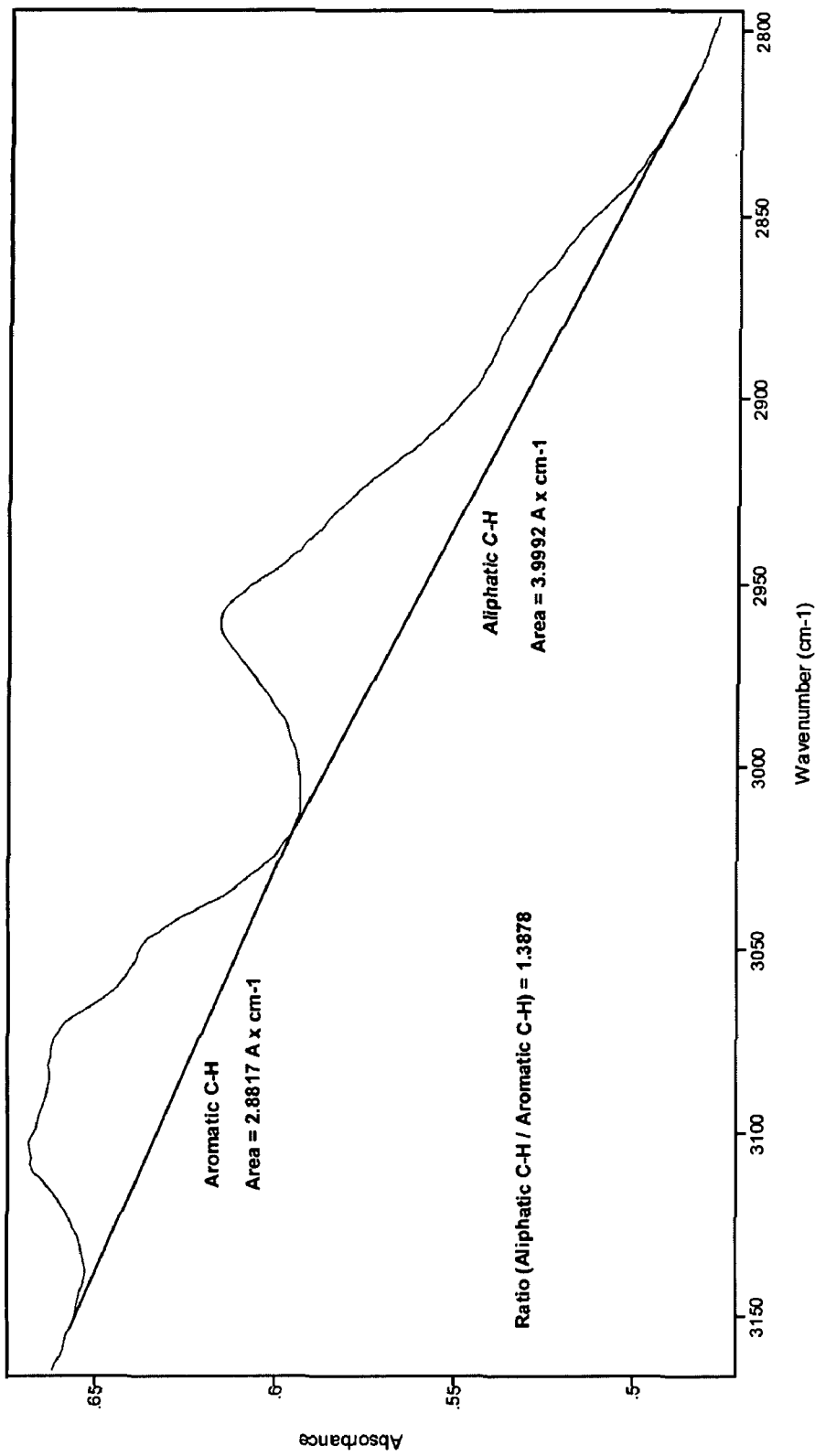
FIG. 5 is an expanded view of the Absorbance Infra-red Spectrum of FIG. 3 corresponding to wavenumbers of about 3150 to 2800 $cm^{-1}$, also showing the Aromatic C-H Area and the Aliphatic C-H Area for the prior art membrane composition from Example 4.

FIG. 5 shows an expanded sectional view of the absorbance values corresponding to wavenumber values of about 3150 to 2800 cm$^{-1}$ from FIG. 3 for the Diepoxycyclooctane PEI membrane of the prior art. Similarly, FIG. 6 shows an expanded sectional view of the absorbance values corresponding to wavenumber values of about 3150 to 2800 cm$^{-1}$ from FIG. 4 for the PEA-DECO chemically cross-linked copolymer membrane.

Figure 6:
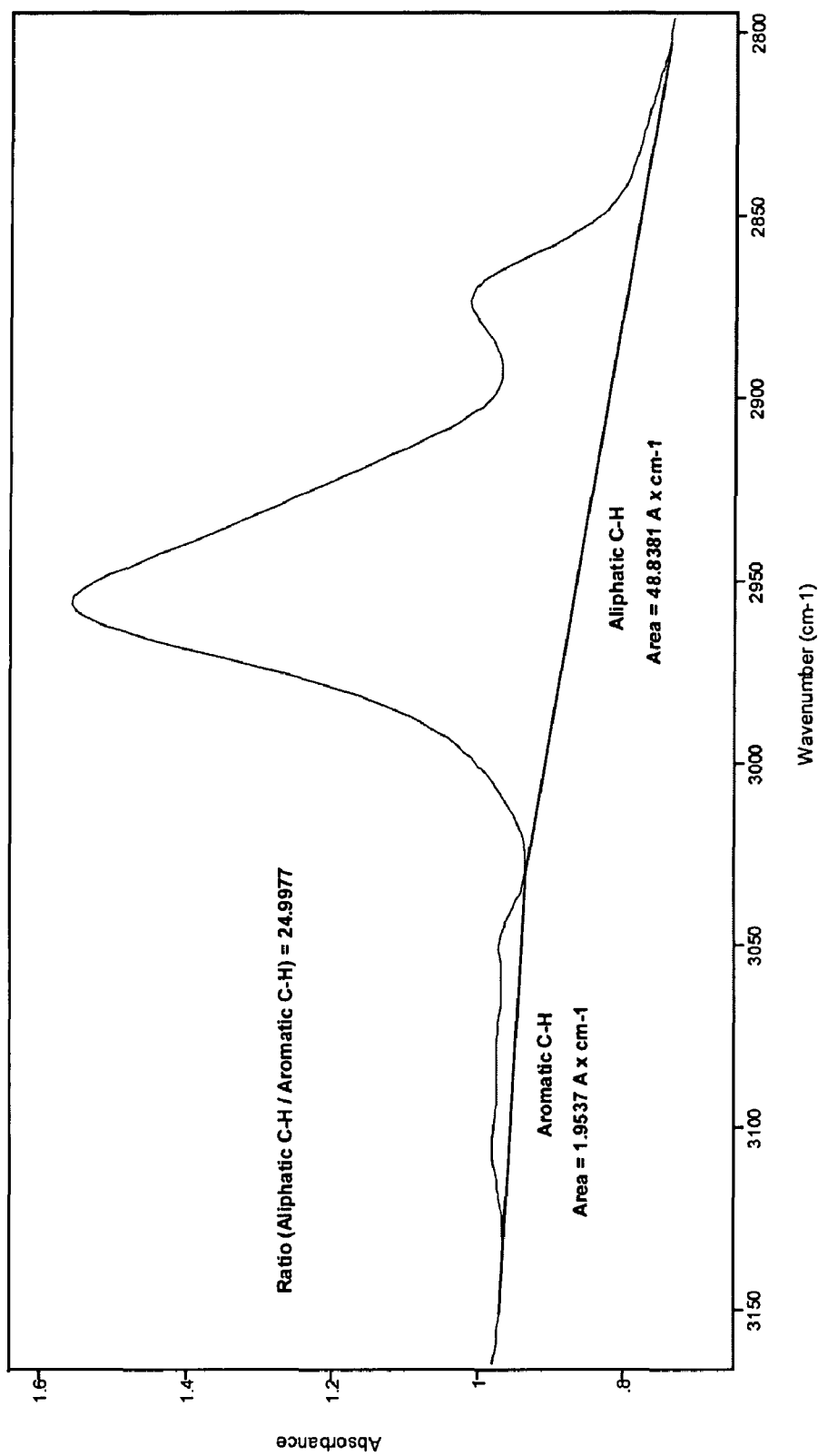
FIG. 6 is an expanded view of the Absorbance Infra-red Spectrum of FIG. 4 corresponding to wavenumbers of about 3150 to 2800 $cm^{-1}$, also showing the Aromatic C-H Area and the Aliphatic C-H Area for one embodiment of a membrane layer composition of the present invention from Example 4.

In FIGS. 5 and 6, in order to evaluate the relative concentration of the aromatic C-H components associated with the membrane's hard segment and the concentration of the aliphatic C-H components associated with the membrane's soft segment peaked the area defined by the absorbance value curve and a "baseline" must be determined for the particular component. The baseline for the aromatic C-H components is determined by a straight line drawn between the two minima on either side of the aromatic C-H component absorbance peak. In FIGS. 5 and 6, these two minima are at approximately 3150 and 3025 cm$^{-1}$, respectively. The area defined by the integrated area between the absorbance values and the baseline between the two minima defines the Aromatic C-H Area. This Aromatic C-H Area is proportional to the hard segment content of the final polymer membrane.

In a similar manner, the baseline for the aliphatic C-H components is determined by a straight line drawn between the two minima on either side of the aliphatic C-H component absorbance peak. In FIGS. 5 and 6, these two minima are at approximately 3025 and 2800 cm$^{-1}$, respectively. The area defined by the integrated area between the absorbance values and the baseline between the two minima defines the Aliphatic C-H Area. This Aliphatic C-H Area is proportional to the soft segment content of the final polymer membrane. The determination of the value of the Aliphatic C-H Area and Aromatic C-H Area for membrane sample as utilized herein is defined by this procedure.

Comparing these areas for the Diepoxycyclooctane PEI membrane of the prior art (FIG. 5) and the PEA-DECO chemically cross-linked copolymer membrane of the present invention (FIG. 6), it can be seen that the PEA-DECO chemically cross-linked copolymer membrane of the present invention in FIG. 6 shows a significant peak in the absorbance values corresponding to wavenumber values of about 3025 to about 2800 cm$^{-1}$ as compared with the same values in the prior art membrane shown in FIG. 5. This shows that the membrane of the present invention possess a significantly higher ratio of the aliphatic C-H soft segment as compared to the aromatic C-H hard segment.

While the absolute areas nor the absolute absorbance values between FIG. 5 and FIG. 6 should not be compared directly, the Aliphatic C-H Area/Aromatic C-H Area ratio (also referred to herein as the "Aliphatic C-H Area to Aromatic C-H Area ratio") for a given membrane is an accurate measurement of the relative concentrations of the Aromatic C-H components and the Aliphatic C-H components of the membrane. Therefore, the ratio of these areas is a suitable measurement for direct comparison of two different polymer membrane specimens. As can be seen comparing FIGS. 5 and 6, the Ratio of Aliphatic C-H Area/Aromatic C-H Area of the Infra-red Absorbance Spectrum is about 1.39 for the Diepoxycyclooctane PEI membrane of the prior art. In contrast, the Ratio of Aliphatic C-H Area/Aromatic C-H Area of the Infra-red Absorbance Spectrum is about 25.00 for the PEA-DECO chemically cross-linked copolymer membrane of the present invention.

As illustrated by this example, the integrally layered membrane elements of the present invention may be fabricated from membrane compositional layers which posses significantly improved structural properties over the prior art.

What is claimed is:

1. A process for selectively separating a desired component from a hydrocarbon feedstream comprising:
   a) contacting one side of a polymeric membrane assembly with the hydrocarbon feedstream, wherein the polymeric membrane assembly is comprised of at least one polymeric membrane element which is comprised of at least two adjacent polymer membrane layers, wherein the two adjacent polymer membrane layer compositions are chemically cross-linked between the contacting faces of the two adjacent polymer membrane layers thereby forming a integrally-layered, multi-layer membrane, and wherein each of the two adjacent polymer membrane layer compositions is comprised of a dianhydride, a diamine, a cross-linking agent and a difunctional dihydroxy polymer selected from:
   i) dihydroxy end-functionalized ethylene propylene copolymers with an ethylene content from about 25 wt % to about 80 wt %;

ii) dihydroxy end-functionalized ethylene propylene diene terpolymers with an ethylene content from about 25 wt % to about 80 wt %;
iii) dihydroxy end-functionalized polyisoprenes; dihydroxy end-functionalized polybutadienes; dihydroxy end-functionalized polyisobutylenes;
iv) dihydroxy end-functionalized acrylate homopolymers, copolymers and terpolymers; dihydroxy end-functionalized methacrylate homopolymers, copolymers and terpolymers; and mixtures thereof, wherein the mixtures of acrylate and methacrylate monomers range from $C_1$ to $C_{18}$;
v) dihydroxy end-functionalized condensation homopolymers, copolymers, terpolymers and higher order compositions of structurally different monomers, including alcohol-terminated end-functionalized esters and dihydroxy end-functionalized multimonomer polyesters; and mixtures thereof, wherein the polyalkyladipate structures range from $C_1$ to $C_{18}$;
vi) dihydroxy end-functionalized perfluoroelastomers;
vii) dihydroxy end-functionalized urethane homopolymers, copolymers, terpolymers, and higher order compositions of structurally different monomers;
viii) dihydroxy end-functionalized carbonate homopolymers, copolymers, terpolymers, and higher order compositions of structurally different monomers;
ix) dihydroxy end-functionalized ethylene alpha-olefin copolymers; dihydroxy end-functionalized propylene alpha-olefin copolymers; and dihydroxy end-functionalized ethylene propylene alpha-olefin terpolymers, wherein the alpha-olefins are linear or branched and range from $C_3$ to $C_{18}$;
x) dihydroxy end-functionalized styrene homopolymers, copolymers, terpolymers, and higher order compositions of structurally different monomers;
xi) dihydroxy end-functionalized silicone homopolymers, copolymers, terpolymers, and higher order compositions of structurally different monomers;
xii) dihydroxy end-functionalized styrene butadiene copolymers; dihydroxy end-functionalized styrene isoprene copolymers; and
xiii) dihydroxy end-functionalized styrene butadiene block copolymers; and dihydroxy end-functionalized styrene isoprene block copolymers;
b) selectively diffusing the desired component from one side of the membrane assembly to the opposite side of the polymeric membrane assembly; and
c) retrieving a permeate from the opposite side of the polymeric membrane assembly; wherein the concentration by wt % of the desired component in the permeate stream is higher than the concentration by wt % of the desired component in the hydrocarbon feedstream.

2. The process of claim 1, wherein the polymer membrane layers are comprised of hard and soft polymer segments and the glass transition temperature, $T_g$, of the soft segment of at least one of the polymer membrane layers is less than 77° F. (25° C.).

3. The process of claim 2, wherein the Absorbance Infra-red Spectrum of at least one polymer membrane layer has a Ratio of Aliphatic C-H Area to Aromatic C-H Area of at least 10.

4. The process of claim 3, wherein the desired component is an aromatic compound.

5. The process of claim 3, wherein the desired component is a sulfur heteroatom.

6. The process of claim 3, wherein the desired component is a nitrogen heteroatom.

7. The process of claim 3, wherein the polymeric membrane assembly is comprised of a membrane support material selected from polytetrafluoroethylene, aromatic polyamide fiber, porous metal, sintered metal, porous ceramic, polyester, nylon, activated carbon fiber, latex, silicone, silicone rubber, polyvinylfluoride, polyvinylidenefluoride, polyurethane, polypropylene, polyethylene, polycarbonate, polysulfone, polyphenylene oxide, metal foam, polymer foam, silica, porous glass, mesh screen, and combinations thereof.

8. The process of claim 7, wherein the polymeric membrane element and the support material are incorporated into a housing configuration selected from flat plate elements, wafer elements, spiral-wound elements, porous monoliths, porous tubes, and hollow fiber elements.

9. The process of claim 8, wherein the polymeric membrane is comprised of a cross-linking agent selected from diepoxycyclooctane, diepoxyoctane, 1,3-butadiene diepoxide, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, poly(propylene glycol) diglycidyl ether, and mixtures thereof.

10. The process of claim 9, wherein the wherein the desired component is an aromatic compound.

11. The process of claim 10, wherein the hydrocarbon feedstream is comprised of a naphtha with a boiling range of about 80 to about 450° F. (27 to 232° C.).

12. The process of claim 11, wherein the glass transition temperature, Tg, of the soft segment of at least one polymer membrane layer is less than 32° F. (0° C.) and the Absorbance Infra-red Spectrum of at least one polymer membrane layer has a Ratio of Aliphatic C-H Area to Aromatic C-H Area of at least 20.

13. The process of claim 12, wherein at least one polymer membrane layer has a soft segment transition temperature, Tg, of less than −13° F. (−25° C.) and a hard segment glass transition temperature, Tg, of greater than 248° F. (120° C.).

* * * * *